(12) United States Patent
Lim

(10) Patent No.: US 9,122,126 B2
(45) Date of Patent: Sep. 1, 2015

(54) FOCUSING LENS ASSEMBLY AND CAMERA HAVING THE SAME

(71) Applicant: Samsung Electronics Co., Ltd, Suwon-si, Gyeonggi-do (KR)

(72) Inventor: Su-kwang Lim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 183 days.

(21) Appl. No.: 13/733,315

(22) Filed: Jan. 3, 2013

(65) Prior Publication Data

US 2013/0242174 A1    Sep. 19, 2013

(30) Foreign Application Priority Data

Mar. 13, 2012  (KR) .......................... 10-2012-0025580

(51) Int. Cl.
*G02B 7/04* (2006.01)
*G03B 3/10* (2006.01)
*G02B 7/08* (2006.01)
*G03B 17/04* (2006.01)

(52) U.S. Cl.
CPC .. *G03B 3/10* (2013.01); *G02B 7/08* (2013.01); *G03B 17/04* (2013.01)

(58) Field of Classification Search
CPC .............. G02B 7/02; G02B 7/04; G02B 7/08; G03B 3/00; G03B 3/02; G03B 3/10; G03B 13/34; G03B 13/36; G03B 17/02; G03B 17/04; H02K 41/0354; H02K 41/0356; H02K 41/0358
USPC .......... 310/12.16; 348/208.11, 240.99, 240.3, 348/357, 360, 361; 359/554, 699, 700, 359/819–830; 396/72–79, 133, 349, 350, 396/529, 530
See application file for complete search history.

(56) References Cited

U.S. PATENT DOCUMENTS

| | | | |
|---|---|---|---|
| 5,182,481 A | | 1/1993 | Sakamoto |
| 2006/0176373 A1* | | 8/2006 | Ito et al. .................... 348/208.12 |
| 2007/0183764 A1* | | 8/2007 | Imura et al. ..................... 396/55 |
| 2011/0273786 A1* | | 11/2011 | Ooya ............................. 359/817 |

* cited by examiner

*Primary Examiner* — Ricky Mack
*Assistant Examiner* — Gary O'Neill
(74) *Attorney, Agent, or Firm* — Staas & Halsey LLP

(57) ABSTRACT

A focusing lens assembly for a camera includes a shaft member disposed in parallel with an optical axis of the camera, a lens mounting member through which the shaft member penetrates and on which a focusing lens is mounted, a focusing lens driving motor configured to allow the lens mounting member to slide according to the shaft member, and a rotating unit configured to rotate the lens mounting member in a first direction in which the focusing lens is deviated from the optical axis or in a second direction in which the focusing lens is arranged on the optical axis according to an ON/OFF operation of the camera power.

24 Claims, 8 Drawing Sheets

FOCUSING LENS ASSEMBLY AND CAMERA HAVING THE SAME

CROSS-REFERENCE TO RELATED APPLICATIONS

This application claims priority from Korean Patent Application No. 10-2012-0025580, filed on Mar. 13, 2012, in the Korean Intellectual Property Office, the disclosure of which is incorporated herein by reference in its entirety.

BACKGROUND OF THE INVENTION

1. Field of the Invention

Apparatuses and methods consistent with exemplary embodiments relate to a focusing lens assembly and a camera having the same.

2. Description of the Related Art

Cameras are typical image capturing apparatus and in recent years, there are typically digital cameras applying digital image sensors such as charge coupled device (CCD) sensors or complementary metal oxide semiconductor (CMOS) sensors.

The camera generally includes a camera main body and a lens barrel mounted on the camera main body. The plurality of groups of imaging lenses are housed inside the lens barrel and a focusing lens for auto focusing (AF) is provided in the camera main body. The plurality of imaging lenses and the focusing lens are arranged along the same optical axis in a row.

In a small camera, the lens barrel may protrude outside the camera main body while in use and is typically housed in the camera main body in non-use. Since the lens barrel is housed in the camera main body in the non-use state, a compact outer appearance of the camera can be realized.

The camera main body should have a thickness capable of housing the lens barrel to house the lens barrel. Therefore, a function configured to house the lens barrel in the camera becomes a factor which interferes with a slim design of the camera.

SUMMARY OF THE INVENTION

Exemplary embodiments may overcome the above described disadvantages and other disadvantages not described above. However, it is understood that exemplary embodiments described herein are not limited to overcoming the disadvantages described above, and also overcome other problems non described above.

One or more exemplary embodiments are provided to a focusing lens assembly suitable for a slim design of the camera and a camera including the same.

Additional features and utilities of the present general inventive concept will be set forth in part in the description which follows and, in part, will be obvious from the description, or may be learned by practice of the general inventive concept.

Exemplary embodiments of the present inventive disclosure provide a focusing lens assembly provided in the camera. The focusing lens assembly may include: a shaft member disposed in parallel to an optical axis of the camera; a lens mounting member through which the shaft member penetrates and on which a focusing lens is mounted; a focusing lens driving motor configured to allow the lens mounting member to slide according to the shaft member; and a rotating unit configured to rotate the lens mounting member in a first direction in which the focusing lens is deviated from the optical axis or in a second direction in which the focusing lens is arranged on the optical axis according to an ON/OFF operation of the camera power.

The rotating unit may include: a rotating member configured to rotate the lens mounting member in the first direction when the camera power is turned off; and a spring member configured to rotate the lens mounting member in the second direction when the camera power is turned on.

The rotating member may include: a rotating member body through which the shaft member penetrates; a rotating lever configured to receive a rotation force necessary to rotate the rotating member body from a lens barrel driving source of the camera; and a rotating pin configured to transfer the rotation force to the lens mounting member.

The lens mounting member may have a pin through hole and the rotating pin may be disposed to penetrate the pin through hole.

The rotating pin may be arranged to be in parallel with the optical axis.

The focusing lens assembly may further include a base member disposed perpendicular to the optical axis and having an escaping groove configured to allow the lens mounting member to be placed therein.

The lens mounting member may be deviated from the optical axis and then placed into the escaping groove by the focusing lens driving motor when the camera power is turned off, while the lens mounting member may be escaped from the escaping groove by the focusing lens driving motor when the camera is turned on.

The focusing lens driving motor may be provided as a voice coil motor.

The voice coil motor may include a coli member mounted on the lens mounting member; at least one magnetic member configured to form a magnetic field around the coil member so that Lorentz force in the optical axis acts on the coil member; and an yoke member configured to assist the formation of the magnetic field of the magnetic member.

The focusing lens assembly may further include a base member which is disposed perpendicular to the optical axis and in which the yoke member is mounted thereon.

In an exemplary embodiment, a settling groove configured to allow the rotating unit to be settled may be formed in the base member.

In an exemplary embodiment, the yoke member may have a tetragonal box shape with opened front and rear.

In an exemplary embodiment, the voice coil motor may include two magnetic members having plate shapes and the two magnetic members may be attached to inner surfaces of the yoke member to face each other.

In an exemplary embodiment, the shaft member may be vertically arranged inside the yoke member and the coil member may be disposed to surround the shaft member.

In an exemplary embodiment, a shaft coupling hole may be provided in the settling groove of the base member and one end of the shaft member may be coupled to the shaft coupling hole.

In an exemplary embodiment, the lens mounting member may have a coil mounting boss surrounded by the coil member.

In an exemplary embodiment, the shaft member may be disposed to penetrate the coil mounting boss.

In an exemplary embodiment, the lens mounting member may include an extension portion extending in a direction vertical to the optical axis; and a focusing lens mounting portion formed in one end of the extension portion. The shaft member may be disposed to penetrate the extension portion.

In an exemplary embodiment, the focusing lens assembly may further include a position detection sensor configured to detect a position of the lens mounting member and the position detection sensor may be mounted on the other end of the lens mounting member.

Exemplary embodiments of the present inventive disclosure also provide a camera including a camera main body; and a lens barrel mounted on the camera main body, the camera main body being provided with the focusing lens assembly according to the first aspect.

Exemplary embodiments of the present inventive disclosure also provide a lens focusing assembly usable with a camera having a retractable lens barrel, the lens focusing assembly including a lens mounting member rotatable about a shaft member to position a focusing lens mounted therein along an optical axis of the camera and away from the optical axis to a resting position; a rotating unit to rotate the lens mounting member about the shaft member based on a state of camera power; and a focusing lens driving portion to move the lens mounting member in a focusing direction along the shaft member and perpendicular to the rotation direction.

In an exemplary embodiment, the rotating unit may include a rotation member body in which the shaft member extends therethrough; a pin arm having a first end connected to the rotation member body and having a rotating pin disposed at a second end which extends through a pin hole in the lens mounting member to rotate the lens mounting member; a lever arm having a first end connected to the rotation member and having a rotating lever disposed at a second end thereof to receive a rotation force to rotate the rotating member body in a first direction; and a spring member configured to rotate the lens mounting member in a second direction when the camera power is turned on.

In an exemplary embodiment, the focusing lens driving portion may include a yoke assembly including magnets to create a magnetic field; and a coil connected to an end of the lens mounting member and surrounding the shaft member to move the lens mounting member in the focusing direction in accordance with a magnetic field applied.

In an exemplary embodiment, the rotation force to rotate the rotating lever is received from a lens barrel driving source which controls positioning of lens barrels of the camera.

In an exemplary embodiment, the lens focusing assembly may further include a base member disposed perpendicular to the optical axis, the base member including: an escaping groove configured to allow the lens mounting member to be disposed therein when moved away from the optical axis; and a settling groove configured to allow the rotating unit to be rotatably settled therein.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 5A and 5B are views explaining an operation of a focusing lens assembly when a camera power is turned off, wherein FIG. 5A shows the case in which a focusing lens is deviated from an optical axis and FIG. 5B shows the case in which a lens mounting member is settled in an escaping groove of a base member; and FIGS. 6A and 6B are views illustrating an operation of a focusing lens assembly when a camera power is turned on, wherein FIG. 6A shows the case in which a lens mounting member is escaped from an escaping groove of a base member and FIG. 6B shows the case in which a focusing lens moves on an optical axis.

DETAILED DESCRIPTION OF THE PREFERRED EMBODIMENTS

Figure 1:
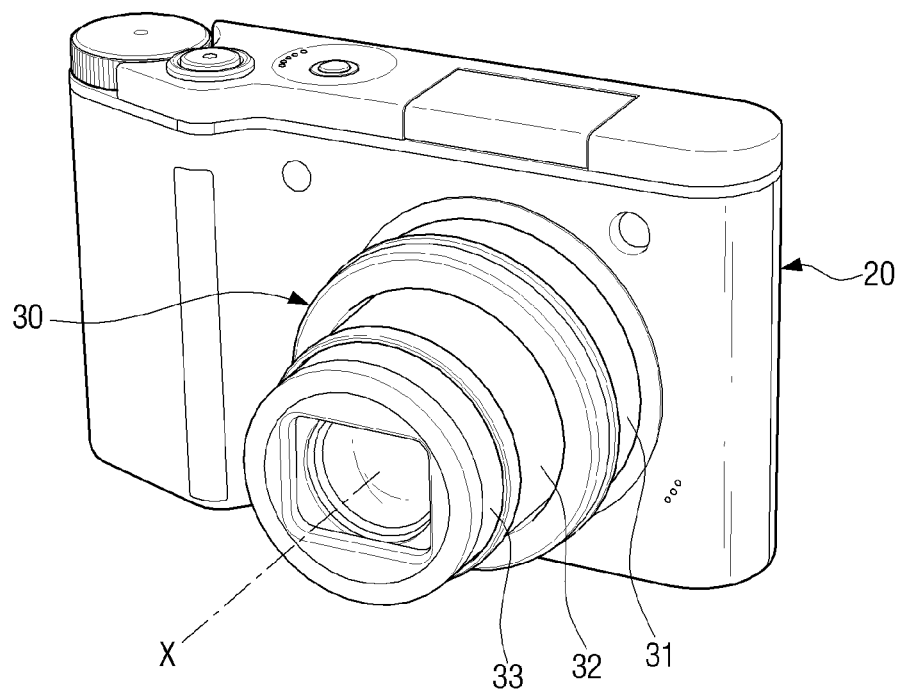
FIG. 1 is a perspective view illustrating a camera according to an exemplary embodiment.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a perspective view of a camera according to an exemplary embodiment.

Referring to FIG. 1, a camera 10 is a small digital camera to which a digital imaging device such as a CCD sensor or a CMOS image sensor is applied.

The camera 10 includes a camera main body 20 and a lens barrel 30 including a plurality of barrel sections 31, 32, and 33. A plurality of groups of imaging lenses (not shown) are mounted in the lens barrel 30. For example, three groups or four groups of imaging lenses may be provided in the lens barrel 30. The imaging lenses are arranged along an optical axis X of the camera 10 and light from objects is focused on the imaging device through the imaging lenses.

A lens barrel driving source (for example, a direct current (DC) motor) (not shown) configured to drive the lens barrel 30 is provided in the camera main body 20. A rotation force generated by the lens barrel driving source may be converted into a linear force by a cam structure and transferred to the barrel sections 31, 32, and 33, and thus the barrel sections 31, 32, and 33 may move forward or backward along the optical axis X.

A zooming function of the camera 10 is accomplished by forward and backward movements of the barrel sections 31, 32, and 33. When power of a camera 10 is turned off by a user or by other means, the barrel sections 31, 32, and 33 may move backward, and thus the lens barrel 30 may be housed in the camera main body. Thereby, an outer appearance of the camera 10 in the non-use state can be more compact.

The above-described camera 10 includes a focusing lens assembly 100 in the camera main body 20 thereof. Hereinafter, the focusing lens assembly 100 will be described in more detail.

Figure 2:
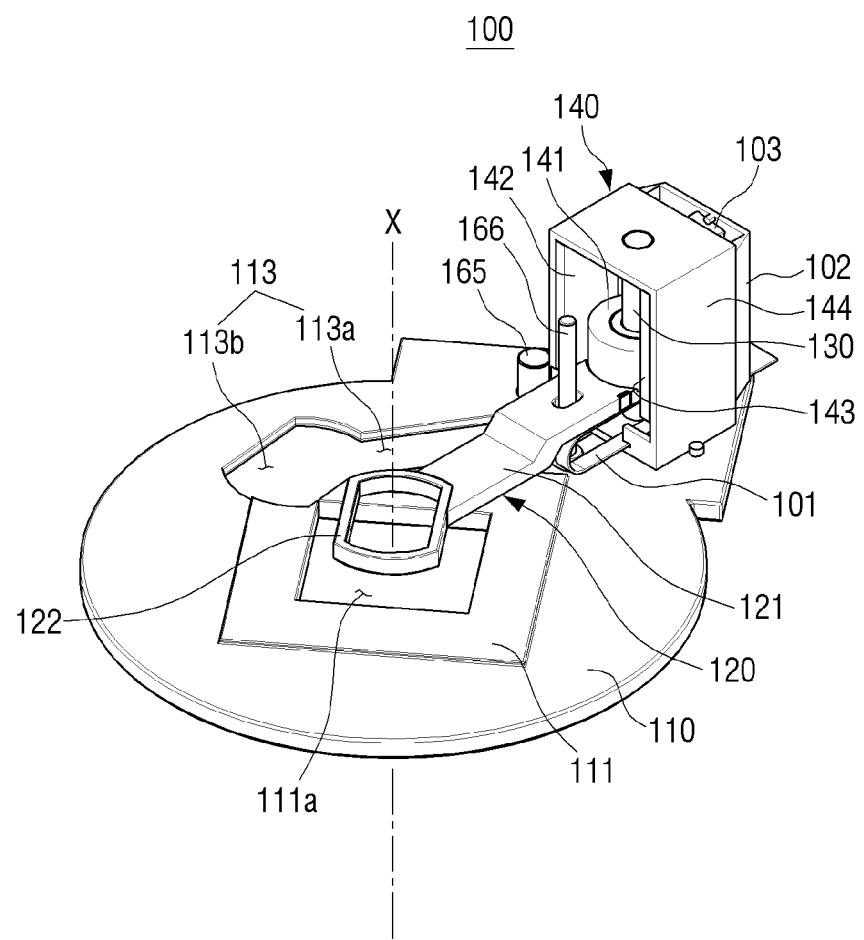
FIG. 2 is a perspective view illustrating a focusing lens assembly embedded in the camera of FIG. 1.
Figure 3:
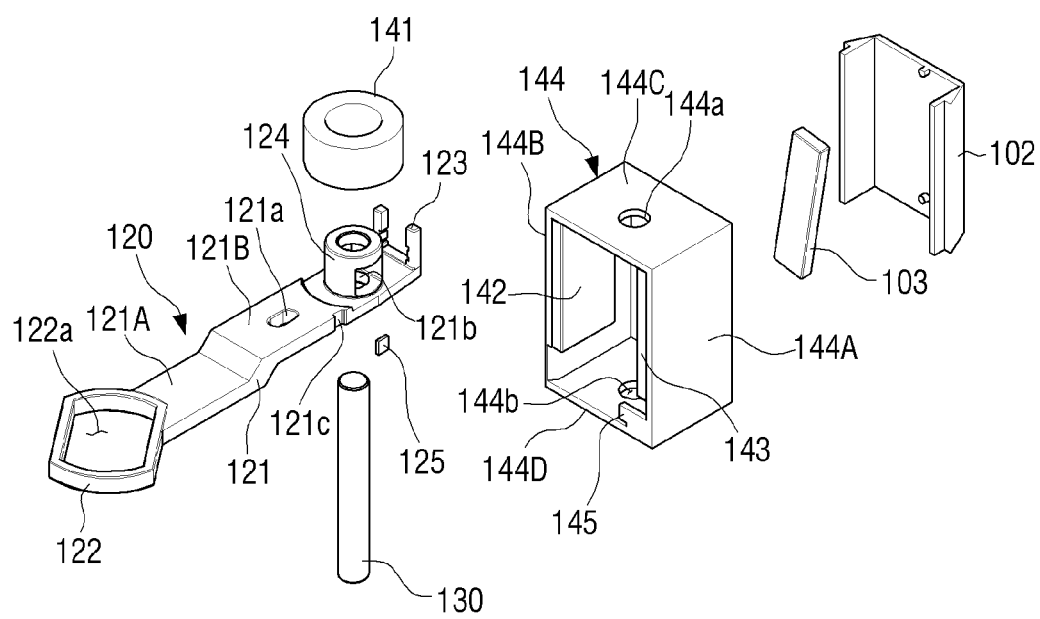
FIG. 3 is a perspective view illustrating some parts of the focusing lens assembly of FIG. 2.
Figure 4:
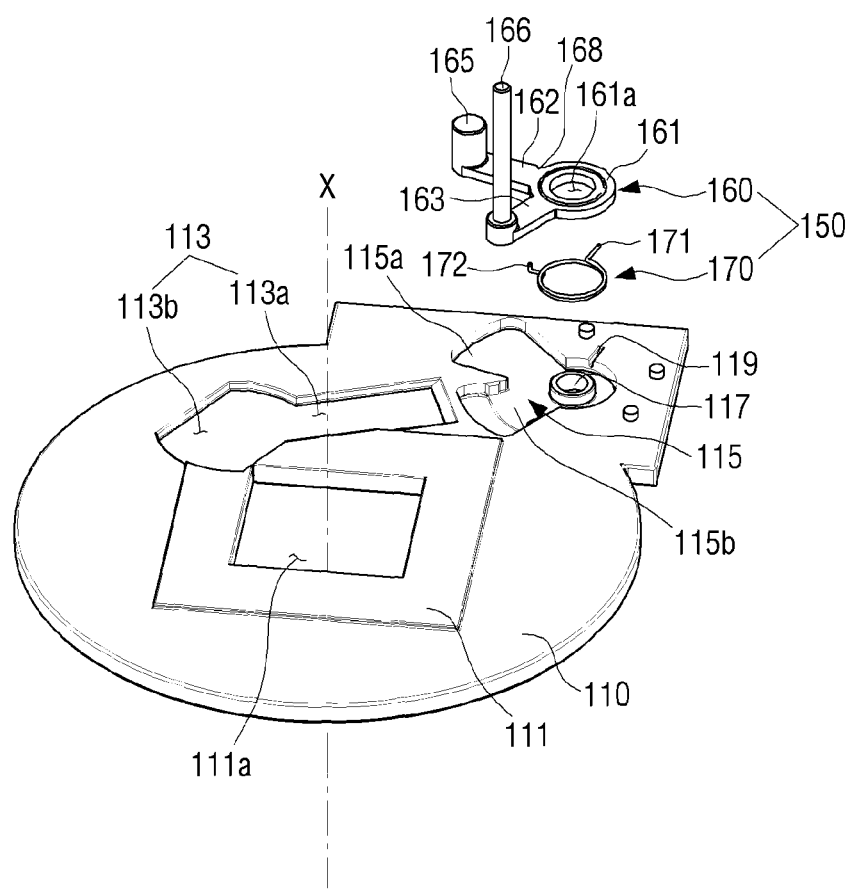
FIG. 4 is a perspective view illustrating the other parts of the focusing lens assembly of FIG. 2.

FIG. 2 is a perspective view of a focusing lens assembly embedded in the a camera of FIG. 1, FIG. 3 is a perspective view illustrating some parts of the focusing lens assembly of FIG. 2, and FIG. 4 is a perspective view illustrating other parts of the focusing lens assembly of FIG. 2

Referring to FIGS. 2 to 4, the focusing lens assembly 100 includes a base member 110, a lens mounting member 120, a shaft member 130, and a focusing lens driving motor 140.

The base member 110 has a plate shape and is disposed perpendicular to the optical axis X of the camera 10. The base member 110 is also disposed adjacent to a rear surface of the camera main body 20. The base member 110 is provided with an imaging device mounting portion 111 on which the imaging device (not shown) such as a CCD sensor or a CMOS image sensor is mounted. More specifically, the imaging device is mounted on a tetragonal mounting hole 111a formed in a central portion of the imaging device mounting portion 111.

The lens mounting member 120 includes an extension portion 121 extending in a direction perpendicular to the optical axis X and a lens mounting portion 122 formed in one end of the extension portion 121.

The extension portion 121 includes a first extension portion 121A and a second extension portion 121B. The first and second extension portions 121A and 121B are formed to be stepped with each other so that the first extension portion 121A is disposed closer to the base member 110 as compared with the second extension portion 121B.

A pin through hole 121a and a shaft through hole 121b are formed in the second extension portion 121B. A position sensor mounting portion 123 is provided in an outer end of the second extension portion 121B. In addition, a coil mounting boss 124 is provided on an upper surface of the second extension portion 121B and an iron piece groove 121c is formed in a side of the second extension portion 121B. An iron piece 125 is mounted on the iron piece groove 121c.

The lens mounting hole 122a is formed in the lens mounting portion 122 and a focusing lens (not shown) having a shape corresponding to the lens mounting hole 122a is coupled to the lens mounting hole 122a. As shown in FIG. 1, when capturing an image (that is, when the power is turned on), the focusing lens is arranged on the optical axis X and disposed to face the imaging device mounted on the base member 110.

The lens mounting member 120 may slide along the shaft member 130 by the focusing lens driving motor 140. As the lens mounting member 120 slides along the shaft member 130, a distance between the focusing lens (not shown) mounted on the lens mounting portion 122 and the imaging device (not shown) mounted on the base member may be controlled. Auto focusing is obtained by the controlling of this distance.

The focusing lens driving motor 140 causes the lens mounting member 120 to slide along the shaft member 130 so that the focusing lens mounted on the lens mounting portion 122 may be moved away from or moved close to the imaging device.

The focusing lens driving motor 140 may be provided as a voice coil motor. In other exemplary embodiments, the focusing lens driving motor may be provided as a step motor or a piezo motor.

The focusing lens driving motor 140 includes a coil member 141, first and second magnetic members 142 and 143, and a yoke member 144.

The coil member 141 is wound around the coil mounting boss 124 provided on the lens mounting member 120. Referring to FIGS. 2 and 3, the shaft member 130 penetrates the coil mounting boss 124 and thus the coil member 141, while being wound around the coil mounting boss 124, is also disposed to surround the shaft member 130.

The first and second magnetic members 142 and 143 have rectangular shapes. The number and shape of the magnetic members may be changed according to a design condition, and can have any number and/or shapes as long as they perform the intended purposes of the inventive concept as described herein. The magnetic members 142 and 143 form a magnetic field around the coil member 141.

The yoke member 144 assists formation of the magnetic field of the magnetic members 142 and 143. Thus, the yoke member 144 is formed of a ferromagnetic material (for example, iron). The yoke member 144 has a tetragonal box shape with an opened front and rear. In other words, the yoke member 144 includes four tetragonal plates 144A, 144B, 144C, and 144D which form an empty space in a central portion thereof. The above-described two magnetic members 142 and 143 are attached to inner surfaces of the yoke member 144 to face each other.

A shaft supporting hole 144a is formed in a top tetragonal plate 144C of the yoke member 144 and a shaft guiding hole 144b is formed in a bottom tetragonal plate 144D of the yoke member 144. Upper and lower portions of the above-described shaft member 130 are inserted into the shaft supporting hole 144a and the shaft guiding hole 144b, and thus the shaft member 130 is arranged to extend through the yoke member 144 while in parallel with the optical axis X. Like the yoke member 144, the shaft member 130 has an auxiliary function to form the magnetic field of the magnetic members 142 and 143, and thus the shaft member 130 is formed of a ferromagnetic material (for example, iron).

A voltage is applied to the coil member 141 by a flexible circuit board 101 shown in FIG. 1. Current flows in the coil member 141 in a clockwise direction or a counterclockwise direction when the voltage is applied to the coil member 141 and a Lorentz force parallel to the optical axis X acts on the coil member 141 by an interaction between the current and the magnetic field formed by the magnetic members 142 and 143. By the Lorentz force, the lens mounting member 120 to which the coil member 141 is coupled can move along the shaft member 130 in a focusing direction.

A rear cover 102 and a third magnetic member 103 are illustrated in FIG. 3. The rear cover 102 is coupled to the rear side of the yoke member 144 having the tetragonal box shape. The third magnetic member 103 is attached to an inner surface of the rear cover 102. The third magnetic member 103 has a rectangular shape, and is arranged at an angle with respect to the optical axis X, and is therefore slightly inclined with respect to the optical axis X, and not in parallel with the optical axis X.

A position detection sensor (not shown) is mounted on the position sensor mounting portion 123 of the above-described lens mounting member 120 and the position detection sensor detects the magnetic field formed by the third magnetic member 103. The lens mounting member 120 slides along the shaft member 130, and thus an amount of the magnetic field detected by the position detection sensor changes. Therefore, the position in the direction of the optical axis X of the focusing lens mounted on the lens mounting member 120 may be detected based on the change in the amount of the magnetic field.

Referring to FIG. 4, the focusing lens assembly 100 further includes a rotating unit 150. The focusing lens arranged on the optical axis X during non-use of the camera moves to the position deviated from the optical axis X by the rotating unit 150, while the focusing lens positioned in the deviated position from the optical axis X during use of the camera moves toward the optical axis X by the rotating unit 150.

The rotating unit 150 includes a rotating member 160 and a spring member 170.

The rotating member 160 includes a rotating member body 161, and a rotating lever 165 and a rotating pin 166 provided in the rotating member body 161. A shaft through hole 161a is formed in the rotating member body 161. The rotating member body 161 includes a lever arm 162 supporting the rotating lever 165 and a pin arm 163 supporting the rotating pin 166.

The spring member 170 is provided as a torsion spring. Alternatively, in the other exemplary embodiments, other types of springs may be applied as the spring member 170. The spring member 170 is disposed below the rotating member body 161. The spring member 170 has first and second end portions 171 and 172. The first end portion 171 is fixed to a first fixing groove 119 formed in the base member 110 and the second end portion 172 is fixed to a second fixing groove 168 formed in the rotating member body 161.

A settling groove 115 configured to allow the rotating member 160 and the spring member 170 to be settled therein is formed in the above-described base member 110. As shown in FIG. 4, the settling groove 115 has a shape substantially corresponding to a shape of the rotating member 160, and includes a lever arm corresponding portion 115a corresponding to the lever arm 162 and a pin arm corresponding portion 115b corresponding to the pin arm 163. A width of the lever arm corresponding portion 115a is larger than that of the lever arm 162 and a width of the pin arm corresponding portion 115b is larger than that of the pin arm 163. Thus, the rotating member 160 is rotatable in the settling groove 115 in a clockwise direction or a counterclockwise direction in a constant angle range.

As shown in FIG. 4, the base member 110 includes a shaft coupling hole 117 disposed in the settling groove 115. The bottom end portion of the shaft member 130 (see FIGS. 2 and 3) penetrates the shaft through hole 161a of the rotating member body 161 and is coupled to the shaft coupling hole 117 on the base member 110. Thus, the shaft member 130 may be fixed to the base member 110 to extend perpendicular thereto.

On the other hand, as shown in FIG. 4, the base member 110 includes an escaping groove 113 having a shape corresponding to a shape of the lens mounting member 120. More specifically, the escaping groove 113 includes a first escaping groove portion 113a corresponding to the first extension portion 121A (see FIG. 3) of the lens mounting member 120 and a second escaping groove portion 113b corresponding to the lens mounting portion 122 of the lens mounting member 120. When the power of the camera is turned off, the lens mounting member 120 is deviated from the optical axis X and escapes into the escaping groove 113. That is, the escaping groove 113 is a location in which the lens mounting member 120 becomes settled within during non-use of the camera.

Hereinafter, an operation of the described-above focusing lens assembly 100 will be described in detail.

Figure 5A:
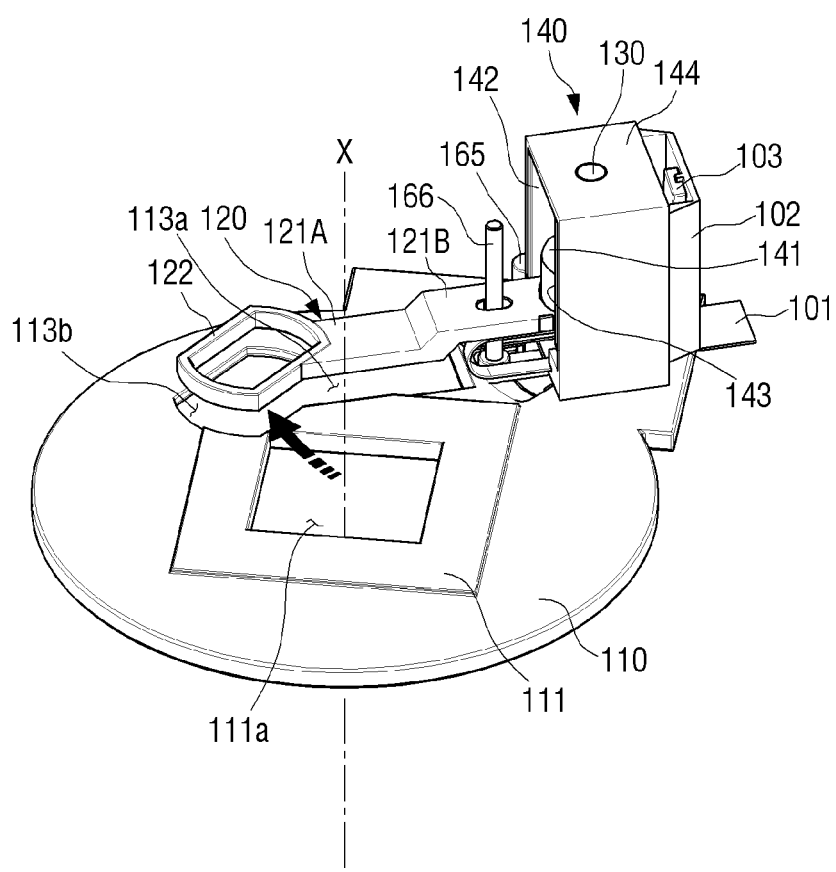
Figure 5B:
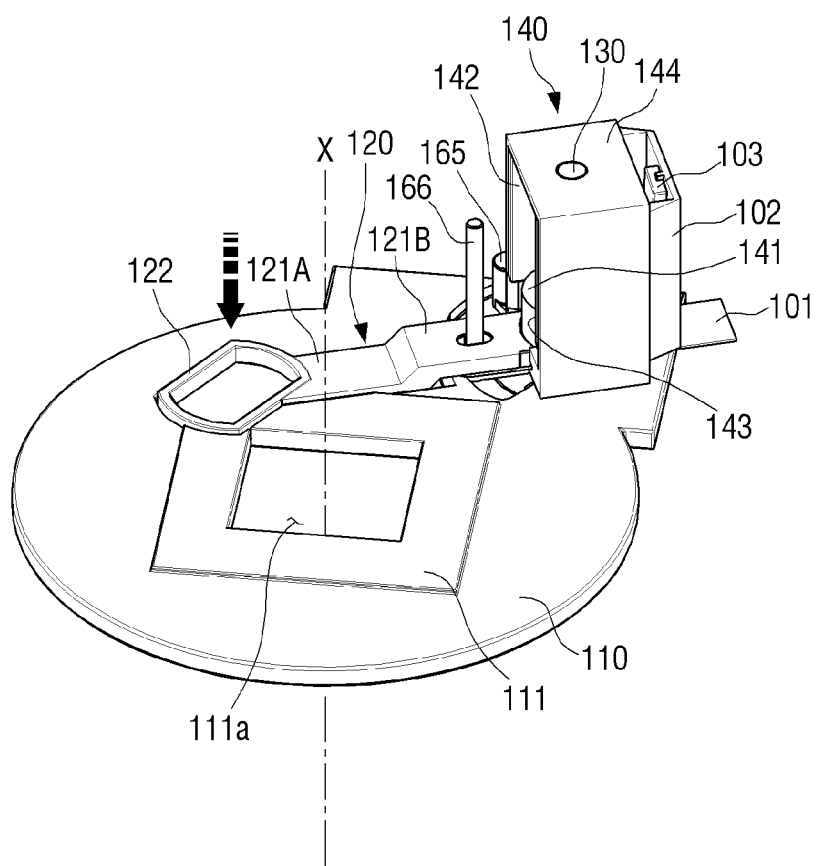

First, the operation of the focusing lens assembly 100 when the power of the camera is turned off will be described with reference to FIGS. 5A and 5B. FIGS. 5A and 5B are views explaining the operation of the focusing lens assembly when the power of the camera is turned off. FIG. 5A shows the case in which the focusing lens is deviated from the optical axis and FIG. 5b shows the case in which the lens mounting member is settled into the escaping groove 113 of the base member 110.

When a user turns off the power of the camera 10, each of the sections 31, 32, and 33 (see FIG. 1) of the lens barrel 30 moves backward along the optical axis X by the lens barrel driving source (not shown), and thus each of the sections 31, 32, and 33 becomes housed within the camera main body 20.

At this time, a part of a rotation force of the lens barrel driving source is transferred to the rotating lever 165 of the rotating member 160. Thus, while the rotating member 160 rotates about the shaft member 130 by a constant angle, the rotating member 160 simultaneously rotates the lens mounting member 120 as a result of the rotating pin 166 extending through the pin through hole 121a. Therefore, as shown in FIG. 5A, when the power of the camera is turned off, the lens mounting member 120 rotates by the constant angle in one direction (first direction) about the shaft member 130, and thus the focusing lens (not shown) arranged on the optical axis X while the camera is in use (powered on) becomes deviated from the optical axis X and placed over the second escaping groove 113b of the base member 110.

The focusing lens driving motor 140 (i.e., voice coil motor) is actuated immediately when such rotation operation of the lens mounting member 120 ends and a Lorentz force directed to the base member 110 is applied to the coil member 141. Then, as shown in FIG. 5B, the lens mounting member 120 slides toward to the base member 110 by a predetermined distance along the shaft member 130 by action of the Lorentz force. Thus, the lens mounting member 122 and the first extension portion 121A of the lens mounting member 120 become seated (or settled) in the escaping groove 113 including the first and second escaping grooves 113a and 113b. As a result, when the power of the camera is turned off, the lens mounting member 120, on which the focusing lens is mounted, escapes to the escaping groove 113 in the base member 110.

Figure 6A:
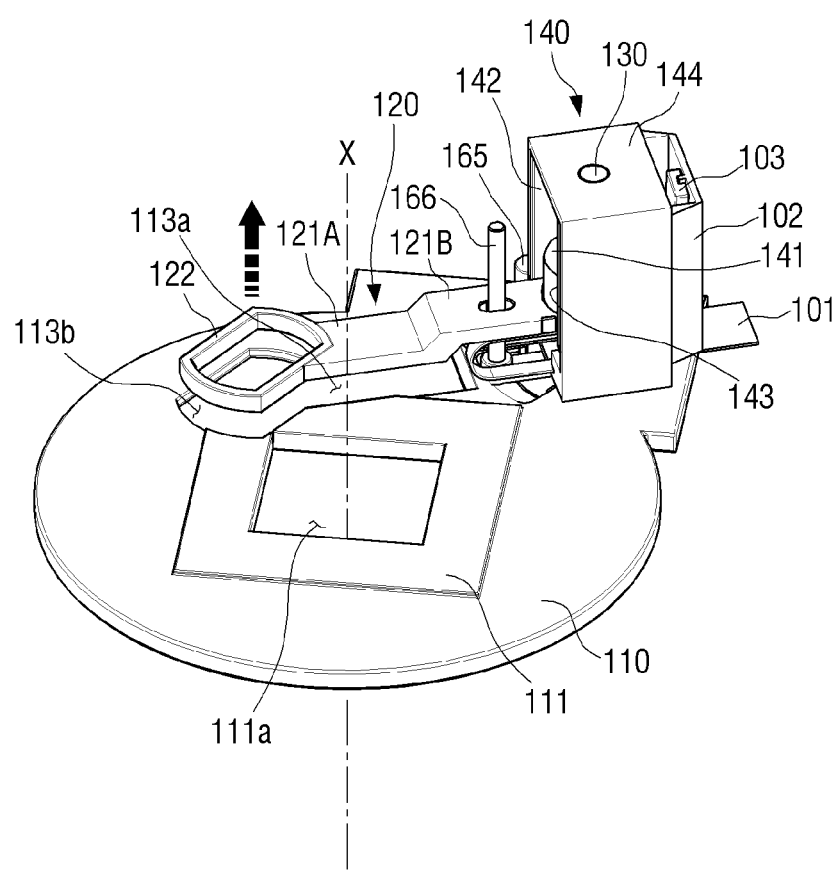
Figure 6B:
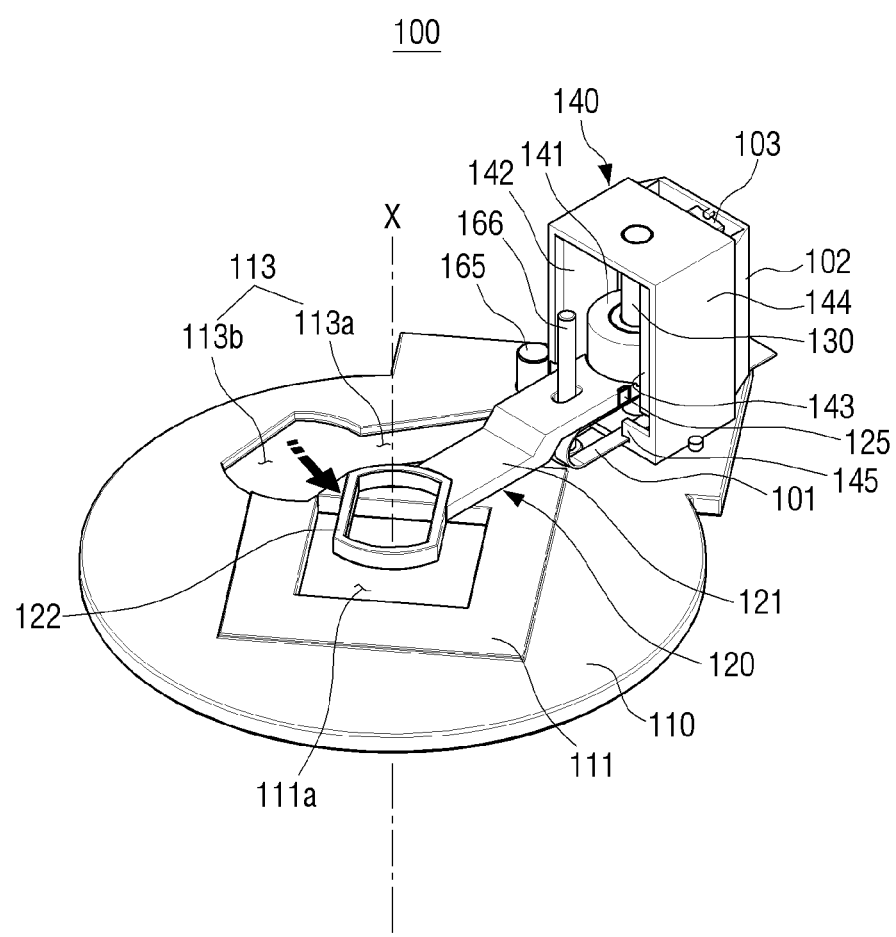

Next, the operation of the focusing lens assembly 100 when the power is turned on will be described with reference to FIGS. 6A and 6B. FIGS. 6A and 6B are views explaining the operation of the focusing lens assembly when the power of the camera is turned on. FIG. 6A shows the case in which the lens mounting member has escaped from the escaping groove 113 of the base member 110, and FIG. 6B shows the case in which the focusing lens moves toward the optical axis X and away from the escaping groove 113.

When the user turns on the power of the camera 10, each of the sections 31, 32, and 33 of the lens barrel 30 (see FIG. 1) moves forward along the optical axis X by the lens barrel driving source (not shown), and thus each section protrudes outward from the camera main body 20.

At this time, the focusing lens driving motor 140 is actuated so that a Lorentz force in a direction distant from the base member 110 is applied to the coil member 141. Thus, as shown in FIG. 6A, the lens mounting member 120 slides by a predetermined distance in the direction away from the base member 120 along the shaft member 130 by the action of the Lorentz force. Therefore, the lens mounting portion 122 and the first extension portion 121A of the lens mounting member 120 escape from the first and second escaping grooves 113a and 113b.

Immediately after the sliding operation of the lens mounting member 120 ends, a portion of the rotation force of the above-described lens barrel driving source is applied to the rotating lever 165 of the rotating member 160, and thus the rotating member 160 is rotated by a constant angle about the shaft member 130 and the rotation force of the rotating member 160 is transferred to the lens mounting member 120 through the rotating pin 166. Accordingly, as shown in FIG. 6B, when the power of the camera is turned on, the lens mounting member 120 is rotated by a constant angle in one direction (second direction) about the shaft member 130 and thus the focusing lens at the deviated position from the optical axis X is moved to a position on the optical axis X.

It can be understood from FIG. 6B that when the lens mounting member 120 is rotated in the second direction, the flexible circuit board 101 is interrupted by a stopper 145 provided in the yoke member 144, and thus the rotation of the lens mounting member 120 is stopped.

On the other hand, auto focusing is performed while the lens mounting member 120 in a state illustrated in FIG. 6B moves along the optical axis X. At this time, the iron piece 125 shown in FIG. 6B is pulled toward the second magnetic member 143, and thus the lens mounting member 120 is closely attached to the rotating pin 166 which is penetrating therethrough. Thus, during performing of the auto focusing process, unnecessary tilt of the lens mounting member 120 can be prevented.

In the above-described camera 10 according to the exemplary embodiment, since a voice coil motor is used as the focusing lens driving motor 140 to move the focusing lens in the optical direction, speed is increased and noise is reduced as compared to using other known focusing lens driving sources (for example, step motor).

Further, when the power of the camera is turned off, the focusing lens is deviated from the optical axis X to be settled within a groove of the base member, and thus the camera main body has the capability to house the lens barrel while minimizing the thickness thereof. More specifically, the space on the optical axis X in which the focusing lens is located during use of the camera may be provided as a portion of a space to house the lens barrel during non-use of the camera, and thus the camera main body may be designed to have a thinner thickness. Therefore, the camera according to the exemplary embodiments may be suitable for a more slim design than other cameras.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A focusing lens assembly provided in a camera, the assembly comprising:
   a shaft member disposed in parallel with an optical axis of the camera;
   a lens mounting member through which the shaft member penetrates and on which a focusing lens is mounted;
   a focusing lens driving motor configured to allow the lens mounting member to slide along the shaft member in parallel with the optical axis of the camera;
   a rotating unit configured to rotate the lens mounting member in a first direction in which the focusing lens is deviated from the optical axis or in a second direction in which the focusing lens is arranged on the optical axis according to an ON/OFF operation of camera power; and
   a base member disposed perpendicular to the optical axis and having an escaping groove configured to allow the lens mounting member to be disposed therein.

2. The assembly as claimed in claim 1, wherein the rotating unit includes:
   a rotating member configured to rotate the lens mounting member in the first direction when the camera power is turned off; and
   a spring member configured to rotate the lens mounting member in the second direction when the camera power is turned on.

3. The assembly as claimed in claim 2, wherein the rotating member includes:
   a rotating member body through which the shaft member penetrates;
   a rotating lever configured to receive a rotation force necessary to rotate the rotating member body from a lens barrel driving source of the camera; and
   a rotating pin configured to transfer the rotation force to the lens mounting member.

4. The assembly as claimed in claim 3, wherein the lens mounting member has a pin through hole and the rotating pin is disposed to penetrate the pin through hole.

5. The assembly as claimed in claim 4, wherein the rotating pin is arranged to be in parallel to the optical axis.

6. The assembly as claimed in claim 1, wherein the lens mounting member is deviated from the optical axis and then placed into the escaping groove by the focusing lens driving motor when the camera power is turned off, while the lens mounting member is escaped from the escaping groove by the focusing lens driving motor when the camera is turned on.

7. The assembly as claimed in claim 1, wherein the focusing lens driving motor is provided as a voice coil motor.

8. The assembly as claimed in claim 7, wherein the voice coil motor includes:
   a coil member mounted on the lens mounting member;
   at least one magnetic member configured to form a magnetic field around the coil member so that Lorentz force in the optical axis acts on the coil member; and
   a yoke member configured to assist the formation of the magnetic field of the magnetic member.

9. The assembly as claimed in claim 8, further comprising a base member which is disposed perpendicular to the optical axis and the yoke member is mounted on.

10. The assembly as claimed in claim 9, wherein a settling groove configured to allow the rotating unit to be settled is formed in the base member.

11. The assembly as claimed in claim 10, wherein the yoke member has a tetragonal box shape with opened front and rear.

12. The assembly as claimed in claim 11, wherein the voice coil motor includes two magnetic members having plate shapes and the two magnetic members are attached to inner surfaces of the yoke member to face each other.

13. The assembly as claimed in claim 11, wherein the shaft member is vertically arranged inside the yoke member and the coil member is disposed to surround the shaft member.

14. The assembly as claimed in claim 13, wherein a shaft coupling hole is provided in the settling groove of the base member and one end of the shaft member is coupled to the shaft coupling hole.

15. The assembly as claimed in claim 8, wherein the lens mounting member has a coil mounting boss surrounded by the coil member.

16. The assembly as claimed in claim 15, wherein the shaft member is disposed to penetrate the coil mounting boss.

17. The assembly as claimed in claim 1, wherein the lens mounting member includes:
   an extension portion extending in a direction vertical to the optical axis; and
   a focusing lens mounting portion formed in one end of the extension portion,
   wherein the shaft member is disposed to penetrate the extension portion.

18. The assembly as claimed in claim 17, further comprising a position detection sensor configured to detect a position of the lens mounting member,
   wherein the position detection sensor is mounted on the other end of the lens mounting member.

19. A camera comprising a focusing lens assembly, the focusing lens assembly including:
   a shaft member disposed in parallel with an optical axis of the camera;
   a lens mounting member through which the shaft member penetrates and on which a focusing lens is mounted;

a focusing lens driving motor configured to allow the lens mounting member to slide along the shaft member in parallel with the optical axis of the camera;

a rotating unit configured to rotate the lens mounting member in a first direction in which the focusing lens is deviated from the optical axis and in a second direction in which the focusing lens is arranged on the optical axis according to an ON/OFF operation of a camera power; and a base member disposed perpendicular to the optical axis and having an escaping groove configured to allow the lens mounting member to be disposed therein.

20. A lens focusing assembly usable with a camera having a retractable lens barrel, the lens focusing assembly comprising:

a shaft member disposed in parallel with an optical axis of the camera;

a lens mounting member rotatable about the shaft member to position a focusing lens mounted therein along the optical axis of the camera and away from the optical axis to a resting position;

a rotating unit to rotate the lens mounting member about the shaft member based on a state of camera power;

a focusing lens driving portion to move the lens mounting member in parallel with the optical axis of the camera along the shaft member; and a base member disposed perpendicular to the optical axis and including an escaping groove configured to allow the lens mounting member to be disposed therein when moved away from the optical axis.

21. The lens focusing assembly as claimed in claim 20, wherein the rotating unit comprises:

a rotation member body in which the shaft member extends therethrough;

a pin arm having a first end connected to the rotation member body and having a rotating pin disposed at a second end which extends through a pin through hole in the lens mounting member to rotate the lens mounting member;

a lever arm having a first end connected to the rotation member and having a rotating lever disposed at a second end thereof to receive a rotation force to rotate the rotating member body in a first direction; and a spring member configured to rotate the lens mounting member in a second direction when the camera power is turned on.

22. The lens focusing assembly as claimed in claim 21, wherein the focusing lens driving portion comprises:

a yoke assembly including magnets to create a magnetic field; and a coil connected to an end of the lens mounting member and surrounding the shaft member to move the lens mounting member in parallel with the optical axis of the camera in accordance with a magnetic field applied.

23. The lens focusing assembly as claimed in claim 21, wherein the rotation force is received from a lens barrel driving source which controls positioning of lens barrels of the camera.

24. The lens focusing assembly as claimed in claim 20, wherein the base member further includes a settling groove configured to allow the rotating unit to be rotatably settled therein.

* * * * *